Oct. 7, 1952 P. E. VAN PELT 2,613,013
FILLER NECK AND AIR VENT UNIT FOR WATER TANKS
Filed Dec. 17, 1949
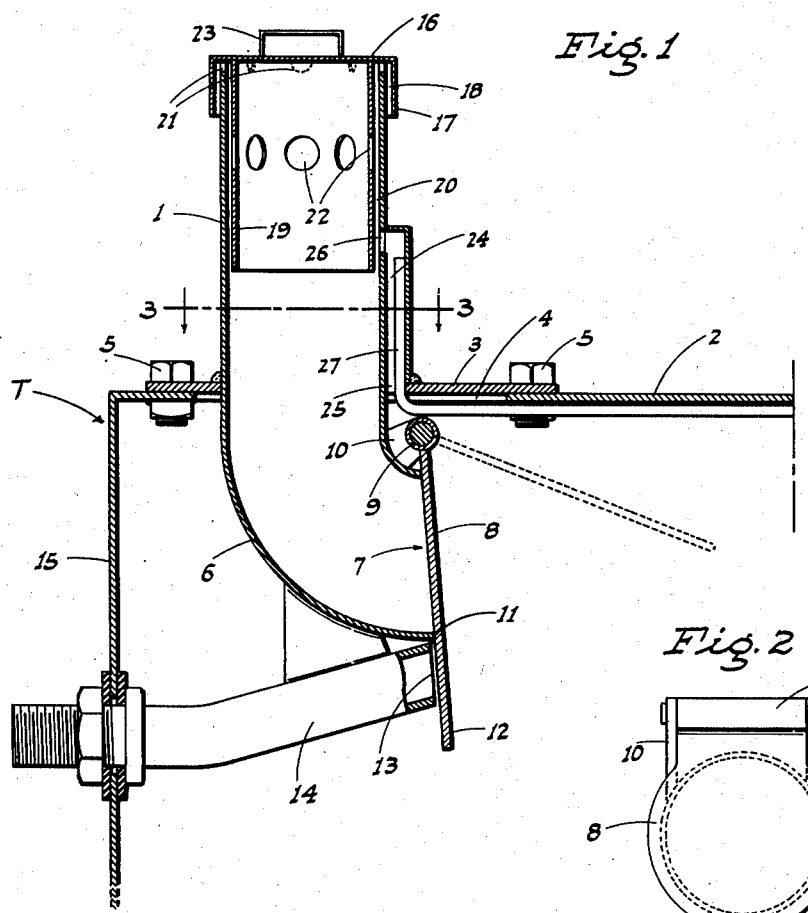
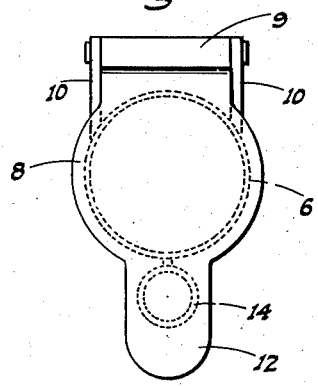
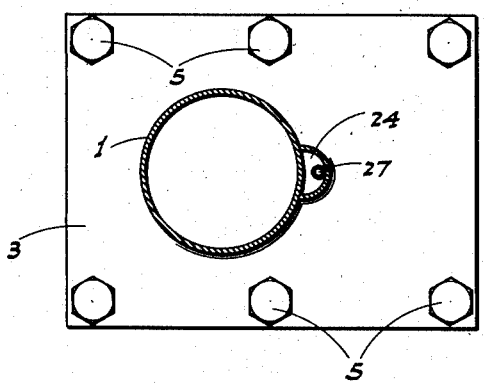
INVENTOR
Percy E. Van Pelt
BY
ATTORNEYS Patented Oct. 7, 1952

2,613,013

UNITED STATES PATENT OFFICE 2,613,013

FILLER NECK AND AIR VENT UNIT FOR WATER TANKS

Percy E. Van Pelt, Oakdale, Calif.

Application December 17, 1949, Serial No. 133,629

2 Claims. (Cl. 220—44)

This invention is directed to, and it is an object to provide, a novel filler neck and air vent unit for water tanks; the device being especially designed, but not limited, for use on the water tank of a rural type fire engine.

Another object of the invention is to provide a filler neck and air vent unit, as above, whose purpose is to permit rapid filling of the tank with water, and to prevent slopping or splashing of the water from the tank when the vehicle accelerates, decelerates, traverses turns, or the like; the venting arrangement being operative to assure against undue pressure in the tank when filling, and undesirable vacuum when pumping from said tank.

An additional object of the invention is to provide a filler neck and air vent unit, for water tanks, which is of relatively large diameter so that the tank can be filled by a water hose inserted in the neck or by water poured from buckets; the arrangement being such that although a large-diameter filler neck is employed, cooperative parts prevent subsequent slopping or splashing from said neck.

A further object of the invention is to provide a filler neck and air vent unit, for the purpose described, which is designed for ease and economy of manufacture and installation; the unit being convenient to use and ever ready to function without manual attention.

Still another object of the invention is to provide a practical and reliable filler neck and air vent unit for water tanks, and one which will be exceedingly effective for the purpose for which it is designed.

These objects are accomplished by means of such structure and relative arrangement of parts as will fully appear by a perusal of the following specification and claims.

Fig. 1 is a sectional elevation of the filler neck and air vent unit as mounted on a water tank.

Fig. 2 is an end elevation of the flap valve.

Fig. 3 is a sectional plan on line 3—3 of Fig. 1.

Referring now more particularly to the characters of reference on the drawings, the device comprises an upstanding filler neck 1 of relatively large diameter; such filler neck being adapted to project above the top 2 of the water tank indicated generally at T. Adjacent, but short of its lower end, the upstanding filler neck 1 is fitted with a surrounding, horizontal attachment plate 3 secured over a preformed opening 4 in the tank top 2 by means of cap screws 5; the lower portion of said filler neck depending through said opening and being in the form of an elbow 6 whose lower end 7 opens horizontally in a lengthwise direction with respect to the tank.

A plate-like flap valve 8 is transversely hinged, as at 9, on mounting ears 10 directly above the lower end 7 of the elbow 6, and normally depends in position to swing against and close said end, as at 11.

When water is fed into the tank T through the filler neck 1, the flap valve 8 swings from its full-line position to its dotted-line position, as in Fig. 1, to permit of free or unrestricted flow into said tank.

However, when the vehicle, upon which the tank T is mounted, is traveling, the flap valve 8 depends by gravity to its closed position, thereby preventing any substantial splashing or slopping of water from within the tank upwardly in the filler neck 1. This is extremely advantageous, as otherwise water from the tank would slop or splash into the filler neck 1 when the vehicle accelerates or decelerates rapidly, or negotiates a turn.

In addition to its function to block the open lower end 7 of the elbow 6, the flap valve 8 serves, through the medium of a depending tongue 12 included in said valve, to similarly block the outlet end 13 of a filler pipe 14 which extends into the tank T through one end 15 thereof and terminates immediately below said lower end 7.

Exteriorly of the tank T the filler pipe 14 is coupled to a valved manifold system (not shown) of the fire engine, which permits water to be fed into the filler pipe 14 from a hydrant, or other source, with or without the booster action of the fire engine pump.

In order to further assure against water slopping or splashing out of the filler neck, yet without restricting air flow in or out of said neck, a manually removable free fitting cap 16 is employed on the upper end of said neck. The cap 16 includes an annular depending flange 17 which surrounds the neck 1 in spaced relation, as at 18, and a baffle sleeve 19 is fixed in the cap concentric to the flange 17, and depends some distance into the neck 1, with space therebetween as at 20.

The upper edge of the filler neck 1 is notched at circumferentially spaced points, as at 21, while the baffle sleeve 19 has a circumferential row of ports 22 therethrough intermediate its ends.

A handle 23 is fitted on the top of the cap 16 to permit of the latter's manual removal or replacement with ease.

With the above described cap any water in the filler neck 1 cannot escape the same, yet free air venting out of, or into, the tank can occur by reason of the spacing 18 and 20, and the notching 21. Additionally, if any undue air surge or pressure occurs in the tank T the cap 16 is free to pop up on the filler neck 1 until the ports 22 are exposed above said neck whereby to immediately relieve said air surge or pressure. Such a condition might exist with the tank T being filled through the filler pipe 14.

The described cap 16 also is advantageous to permit of free air entry into the tank when water is being pumped from the latter; such free air entry being desirable to the end that the creation of a vacuum in the tank is prevented.

Any air which may pocket in the tank at the top thereof above the elbow 6 during filling operations vents upwardly in an external passageway 24 on the outside of the filler neck 1; such passageway opening at its lower end through the attachment plate 3 and into the tank, as at 25, while the upper end of said passageway opens, as at 26, into the filler neck 1 intermediate its ends, and at a point slightly above the normal position of the lower end of the baffle sleeve 19.

In order to prevent air pocketing in the top of the tank at points remote from the filler neck 1, one or more auxiliary vent pipes 27 lead from said points along the under side of the top of the tank 2 and upturn into the passageway 24, as at 28.

With the described filler neck and air vent unit, the tank T can be filled either through the filler neck 1 or filler pipe 14; the filler neck 1 being adapted primarily for use to fill the tank from a hose or water buckets. When the filler neck is so used, the water flow from the lower end opening 7 of elbow 6 forces flap valve 8 to open position so that the water flow into the tank is fast and relatively unrestricted.

Similarly, when water is being fed into the tank T from the filler pipe 14, the force of such water discharging from the outlet end 13 throws the flap valve 8 to an open position with respect to the lower end opening 7 of the elbow 6; the tank then being fully and effectively vented through the neck 1 during the period of time that filling of the tank from the filler pipe 14 is taking place.

Thus, with the particular venting arrangement, as shown and described, the creation of undesirable pressure when filling the tank, and additionally undesirable vacuum when pumping, is avoided; both without manual attention on the part of the operator.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as set forth herein.

Having thus described the invention, the following is claimed as new and useful, and upon which Letters Patent are desired:

1. A filler neck and air vent unit for a water tank, comprising an upstanding filler neck mounted in connection with the tank top and extending above and below the same, the lower end portion of the filler neck being in the form of an elbow opening substantially horizontally in the tank, and a flap-valve hinged above said elbow opening and normally depending in closure relation thereto; there being a filler pipe extending into the tank, said filler pipe including an outlet end below and substantially vertically alined with said elbow opening and opening in the same direction as the latter, and the flap valve including a lower portion depending in normally closing relation to said outlet end of the filler pipe.

2. A filler neck and air vent unit for a water tank, comprising an upstanding filler neck mounted in connection with the tank top and extending above and below the same, the lower end portion of the filler neck being in the form of an elbow opening substantially horizontally in the tank, a flap-valve hinged above said elbow opening and normally depending in closure relation thereto, an air vent passageway communicating between the tank at the top adjacent but independent of the filler neck and the latter at a point above said tank top, and a vented cap removably disposed on the upper end of the filler neck; said cap including a baffle sleeve depending into the filler neck in clearance relation and the sleeve terminating at its lower end below said point.

PERCY E. VAN PELT.

REFERENCES CITED

The following references are of record in the file of this patent:

UNITED STATES PATENTS

| Number | Name | Date |
|---|---|---|
| 1,217,732 | Fedders | Feb. 27, 1917 |
| 1,226,199 | Evans | May 15, 1917 |
| 1,396,606 | Vincent | Nov. 8, 1921 |
| 1,400,511 | Baker | Dec. 20, 1921 |
| 1,482,534 | Woodbridge | Feb. 5, 1924 |
| 1,775,557 | Holbingsworth | Sept. 9, 1930 |
| 1,822,655 | Hamilton | Sept. 8, 1931 |
| 2,066,202 | Jay | Dec. 29, 1936 |
| 2,138,104 | Kellogg | Nov. 29, 1938 |
| 2,365,695 | Grice | Dec. 26, 1944 |
| 2,371,296 | Hopwood | Mar. 13, 1945 |

FOREIGN PATENTS

| Number | Country | Date |
|---|---|---|
| 3,890 | Great Britain | Feb. 17, 1909 |
| 223,823 | Germany | July 2, 1910 |